July 26, 1938.  J. R. KENT  2,124,980
CAN SPOUT AND METERING UNIT
Filed July 26, 1937
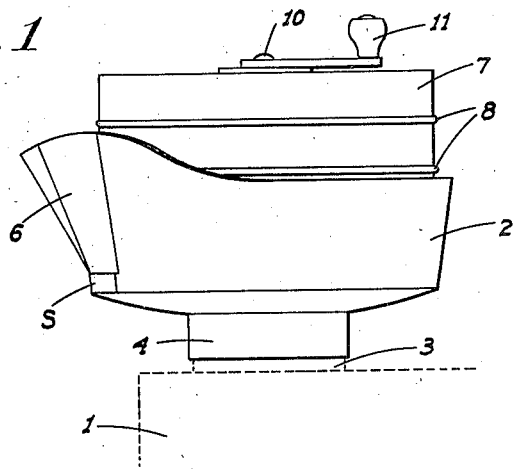
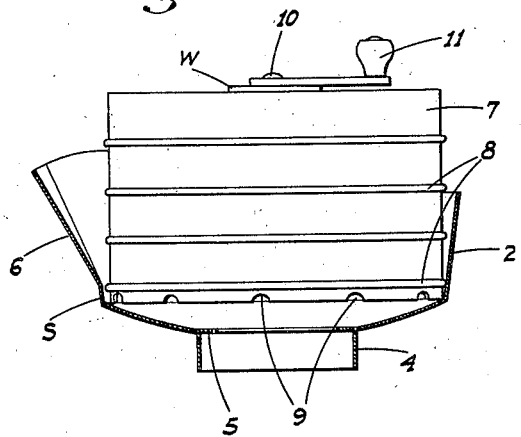
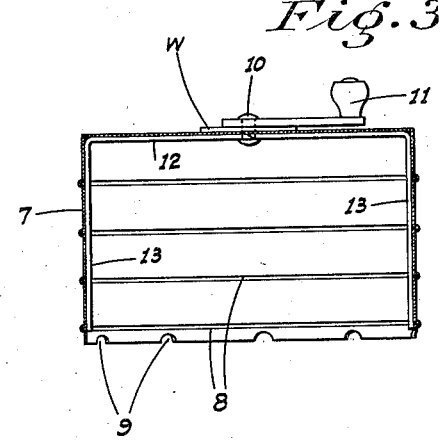
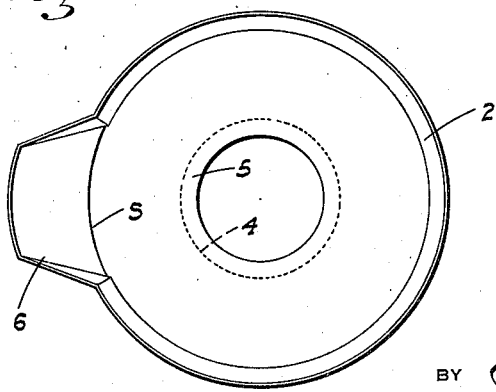
INVENTOR
John R. Kent
BY
ATTORNEY Patented July 26, 1938

2,124,980

UNITED STATES PATENT OFFICE 2,124,980

CAN SPOUT AND METERING UNIT

John R. Kent, Stockton, Calif.

Application July 26, 1937, Serial No. 155,706

5 Claims. (Cl. 221—69)

This invention relates to a pouring spout and metering vessel to receive material as poured from the spout, and is particularly designed for use in dispensing malt extract such as "diamalt" which is used in connection with bakery products in commercial establishments, and which is a viscous sticky liquid. This extract is supplied in containers holding a gallon or more and is now poured directly and as required from such containers into a conventional metering vessel. Some of the liquid thus poured inevitably runs down the outside of the pouring neck or mouth of the container and being sticky it is hard to keep the container in a clean and sanitary condition. Also the neck must be recapped or corked after each pouring operation.

The principal object of my invention is to avoid the inconvenient and "messy" conditions now incident to the dispensing of malt extract as above outlined, by providing a relatively large pouring spout member adapted to be mounted and left on the neck of the supply container after the neck is opened. Cooperating with the spout is a metering vessel into which the liquid may be poured from the spout, and which is arranged to fit into the spout member when not in use in such a manner that any liquid remaining in the vessel may drain back into the container, while at the same time the vessel forms a closure for the neck of the container, rendering it unnecessary to again close the neck itself after it has been once opened.

While as stated the vessel then forms a closure for the neck of the container it does not interfere with the draining back into the container of any liquid remaining on the wall of the spout member after a pouring operation.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side elevation of the device as mounted on a supply container.

Figure 2 is a similar view with the spout member in section.

Figure 3 is a sectional elevation of the metering and closure forming vessel detached.

Figure 4 is a top plan view of the spout member.

Referring now more particularly to the characters of reference on the drawing, the spout attachment for the supply container 1 comprises a circular bowl 2 of considerably greater diameter than the pouring neck 3 of the container. Depending from the bottom of the bowl is a central sleeve or skirt 4 open to the bottom of the bowl and adapted to fit closely over the neck after the latter has been uncapped or uncorked. At its upper end where the sleeve joins the bottom of the bowl, said sleeve is provided with an inwardly projecting flange 5 to engage the top of the neck and limit downward movement of the sleeve. The bottom of the bowl is preferably dished somewhat so that it will be self-draining, while the side wall of the bowl flares with a slight taper to the top.

On one side of the bowl and having its inception a short distance above the bottom edge of the side wall, is a pouring spout 6, the mouth of which is concave with a curvature approximating that of the diameter of the bowl at the bottom, and the sides of which extend somewhat higher than the major portion of the rim of the bowl. In this manner the bowl as a whole may be relatively shallow while avoiding spilling of the liquid over the sides of the spout as the latter is being tipped up during a pouring operation. For the width of the spout at the base the diameter of the side wall of the bowl below the spout is increased slightly as at S for the purpose which will be seen later.

Provided as a part of the unit to cooperate with the spout is a cylindrical metering vessel 7. This is graduated for convenience in metering different amounts of liquid from the container by means of endless circumferential beads 8 spaced apart in the length of the vessel at predetermined intervals. The external diameter of the vessel is but slightly less than the internal diameter of the side of the bowl at its junction with the bottom on which the vessel is adapted to rest in an inverted position, while the diameter of the adjacent bead is such that it will lie closely against the side wall of the bowl as indicated in Fig. 2. Below said bead the vessel is provided with a plurality of drain vents 9, cut into the rim of the vessel, and spaced apart less than the width of the spout at the base for the purpose which will be seen.

This end of the vessel is open, while the opposite end (or the actual bottom of the same) is closed. A pin 10 is turnably mounted in said opposite end of the vessel axially thereof and is fixed outwardly of the vessel on a crank handle 11, a washer W being disposed about the pin between the handle and vessel. On the inside of the vessel the pin is connected to a wiping element which comprises a cross bar 12 engaging the interior surface of the bottom of the vessel and depending bars 13 wiping close against the side of the vessel and disposed opposite to each other. The bars are beveled along one edge so as to exert a clean-cutting action.

In operation, when it is desired to dispense a measured quantity of liquid from the container 1 for mixing with other ingredients, the vessel 7 is lifted from the spout bowl by one hand and held in an upright position or with the bottom down, while the container is tilted and the desired quantity of liquid poured from the spout into the vessel thus held. The vessel is then inverted over the receptacle into which the other ingredients are disposed to discharge its contents, and the handle 11 is at the same time turned to wipe the sticky matter from the side and bottom of the vessel.

When the contents of the vessel have been discharged, said vessel is replaced in an inverted position in the spout, allowing any remaining liquid in the vessel to drain back into the container. The then lowest bead on the vessel, approaching close against the side of the bowl, forms a practically air-tight closure with the bowl, preventing any material amount of air from getting into the uncapped container as well as keeping out dirt etc. The side of the bowl being however slightly spaced from the vessel along the spout area, allows any liquid remaining in the spout to drain freely back through an adjacent vent 9, one of which is always disposed in the spout area on account of the spacing of the vents as previously described.

Handling of the sticky material is therefore facilitated, there is no likelihood of the same dripping about if the vessel and spout are properly manipulated, the metering vessel itself is kept in a clean condition when thus disposed in the spout member, and the main supply in the container is protected against contamination and kept in a sanitary condition.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A dispensing spout for attachment to the discharge neck of a supply container comprising a bowl having a spout formed on one side thereof, a skirt open to and depending from the bowl for coupling engagement with the neck of the container, and a vessel to receive material as poured from the spout adapted when not in use to fit within the bowl to form a closure over the open neck of the container.

2. A dispensing spout for attachment to the discharge neck of a supply container comprising a bowl having a spout formed on one side thereof, a skirt open to and depending from the bowl for coupling engagement with the neck of the container, and a vessel to receive material as poured from the spout adapted when not in use to be disposed in an inverted position within the bowl with its rim resting on the bottom of the bowl; said bottom sloping down to the sleeve whereby liquid draining down the side of the vessel onto said bottom will flow back into the sleeve.

3. A dispensing spout for attachment to the discharge neck of a supply container comprising a bowl having a spout formed on one side thereof, a sleeve open to and depending from the bowl for coupling engagement with the neck of the container, and a vessel to receive material as poured from the spout adapted when not in use to be disposed in an inverted position within the bowl with its rim resting on the bottom of the bowl; the diameter of the vessel relative to the bowl being such that said rim will engage the bottom of the bowl adjacent the side wall of the bowl, and a bead about the vessel adjacent the rim and then substantially engaging said side wall throughout its extent except for the width of the spout, there being drain vents cut into the side wall of the vessel between the rim thereof and said bead.

4. A dispensing spout for attachment to the discharge neck of a supply container comprising a bowl having a spout formed on one side thereof, a sleeve open to and depending from the bowl for coupling engagement with the neck of the container, and a vessel to receive material as poured from the spout adapted when not in use to be disposed in an inverted position within the bowl with its rim resting on the bottom of the bowl whereby to form a closure over the open neck of the container and at the same time allow any matter remaining in the vessel to drain back into the container.

5. A dispensing spout for attachment to the discharge neck of a supply container comprising a bowl having a spout formed on one side thereof, a sleeve open to and depending from the bowl for coupling engagement with the neck of the container, and a vessel to receive material as poured from the spout adapted when not in use to be disposed in an inverted position within the bowl with its rim resting on the bottom of the bowl; the diameter of the vessel relative to the bowl being such that said rim will engage the bottom of the bowl adjacent the side wall of the bowl, and a bead about the vessel adjacent the rim and then substantially engaging said side wall throughout its extent; the side wall of the bowl for substantially the width of and at the spout being arranged to clear the bead and the portion of the side wall of the vessel then below said bead, there being spaced drain vents cut through the side wall of the vessel in the rim thereof, the spacing between adjacent vents being less than the width of the spout.

JOHN R. KENT.